United States Patent [19]

Kuno et al.

[11] 4,026,146

[45] May 31, 1977

[54] FUEL CONSUMPTION MEASURING DEVICE

[75] Inventors: Akira Kuno, Nagoya; Yoshio Shinoda, Okazaki; Hiroshi Arai, Toyota, all of Japan

[73] Assignees: Nippon Soken, Inc., Nishio; Toyota Jidosha Kogyo Kabushiki Kaisha, Toyota, both of Japan

[22] Filed: July 31, 1975

[21] Appl. No.: 600,803

[30] Foreign Application Priority Data

Aug. 7, 1974    Japan .............................. 49-90396

[52] U.S. Cl. .................................................. 73/113
[51] Int. Cl.² ...................................... G01M 15/00
[58] Field of Search .............................. 73/113, 114

[56] References Cited

UNITED STATES PATENTS

| | | | |
|---|---|---|---|
| 3,014,366 | 12/1961 | Faunce | 73/114 |
| 3,118,302 | 1/1964 | Fathauer | 73/114 |
| 3,635,079 | 1/1972 | Tomlinson | 73/114 |
| 3,812,710 | 5/1974 | Bauman et al. | 73/114 |
| 3,908,451 | 9/1975 | Walker et al. | 73/114 |

Primary Examiner—James J. Gill
Attorney, Agent, or Firm—Cushman, Darby & Cushman

[57] ABSTRACT

A fuel consumption measuring device for measuring the amount of fuel consumed by the internal combustion engine of an automobile in which the amount of air drawn into the engine is measured from a signal corresponding to the revolution speed of the engine and another signal corresponding to the amount of gas drawn into the engine whereby to accurately measure the amount of fuel drawn into the engine by virtue of the fact that the ratio between the intake air amount and the intake fuel amount is practically constant at all times.

6 Claims, 3 Drawing Figures

FUEL CONSUMPTION MEASURING DEVICE

BACKGROUND OF THE INVENTION

1. Field of the Invention

The present invention relates to a fuel consumption measuring device for measuring for example the amount of fuel consumed by the internal combustion engine of an autmobile or the like.

2. Descriptoin of the Prior Art

In a known type of fuel gage for measuring the amount of fuel consumed, a float is mounted in the fuel tank in such a manner that the resistance value of a slide rheostat is varied in accordance with the position of the float and the amount of fuel consumed is indicated by an ammeter which detects the value of the current through the slide rheostat. A disadvantage of this type of fuel gage is that when the automobile is running on an inclined road surface, accelerating or decelerating, the fuel level changes and hence the float is fluctuated thus making it impossible to give accurate indications, and moreover due to the complicated configuration of the fuel tank the accuracy of indication is limited to the reading of variations of the fuel quantity greater than 5 liters if the measurement is based on the variations in the fuel level alone. Another known type of fuel gage in which the flow of fuel is directly measured in the fuel pipe leading from the fuel tank to the engine is also disadvantageous in that the amount of fuel consumed by the engine is as small as 10 cc per minute and hence it is almost impossible to directly measure the flow of fuel.

SUMMARY OF THE INVENTION

With a view to overcoming the foregoing difficulty, it is an object of the present invention to provide a fuel consumption measuring device in which the amount of air drawn into an internal combustion engine is measured in accordance with a signal corresponding to the flow rate of gas drawn such as the amount of vacuum in the engine and a revolution signal thereby accurately measuring the amount of fuel drawn in by virtue of the fact that the ratio between the intake air amount and the intake fuel quantity is practically constant and which is thus highly accurate and capable of indicating as well as the instantaneous fuel consumption.

According to an aspect of the present invention, the amount of fuel consumed is measured by a control circuit which is responsive to a signal corresponding to the revolutions of an internal combustion engine and another signal corresponding to the intake gas quantity of the engine, and an indication means informs the driver of the fuel consumption in accordance with the result of the measurement, instead of directly measurring the fuel consumption of the engine which is difficult to measure. Thus, it is possible to easily and accurately measure and inform the driver of the fuel consumption in accordance with the intake gas amount and the revolution speed of the engine which are correlated to the fuel consumption.

According to another aspect of this invention, the pressure in a gas induction passage of an internal combustion engine is detected to generate a signal corresponding to the intake gas amount, and the intake gas amount signal and an engine revolution signal are multiplied together to generate an output signal corresponding to the instantaneous fuel consumption. Thus, it is possible to generate a signal corresponding to the intake gas amount simply through the detection of the pressure in the gas induction passage of the engine which has heretofore been practiced in the art and it is thus possible to obtain an output signal corresponding to the amount of fuel consumed by simply multiplying the signal corresponding to the intake gas amount and the revolution signal together.

According to still another aspect of the invention, there is used an indication means consisting of a display unit which indicates the fuel consumption from moment to moment. Thus, it is possible to accurately inform the driver of the instantaneous fuel consumption and thereby to enable the driver to operate the engine economically.

According to still another aspect of the present invention, the fuel quantities consumed are integrated by an integration circuit and an indication means informs the driver of the accumulated total fuel consumption. Thus, it is possible to accurately measure the accumulated total fuel consumption and thereby to inform the driver of the amount of fuel in the tank.

According to still another aspect of the present invention, the fuel consumption measured by a control circuit is converted into signals each thereof corresponding to a unit quantity of the fuel, and thus it is possible to generate a signal for every unit quantity of the fuel consumed thus permitting the driver to know the fuel consumption accurately in accordance with the rate of generation of the signals.

According to still another aspect of the present invention, signals each corresponding to a unit quantity of the fuel consumed are counted and integrated by a counter type integration circuit. Thus, it is possible to accurately measure the accumulated total fuel consumption by simply counting and integrating the unit quantity signals.

According to still another aspect of the present invention, an integrated value holding supply voltage is applied to a counter type integration circuit even after the supply of supply voltage to the indication means has been interrupted. Thus, the previously attained integrated value is maintained in the counter type integration circuit when the indication means is stopped operating and in this way the indication means is allowed to continuously operate on the previously attained integrated value when it is again brought into operation.

According to still another aspect of the present invention, an indication means consists of display means which indicates the accumulated total fuel consumption every moment and unit signals smaller than the minimum indication unit of the display means are taken to indicate the fuel consumption. Thus, not only the accumulated total fuel consumption can be indicated by the display means to show it to the driver, but also the driver can be informed of the instantaneous rate of fuel consumption, thereby allowing the driver to know simultaneously both the instantaneous amount of fuel in the tank and the instantaneous consumption rate of fuel and greatly contributing to the efficient operation of the engine.

DESCRIPTION OF THE PREFERRED EMBODIMENTS

The present invention will now be described in greater detail with reference to the illustrated embodiments.

Figure 1:
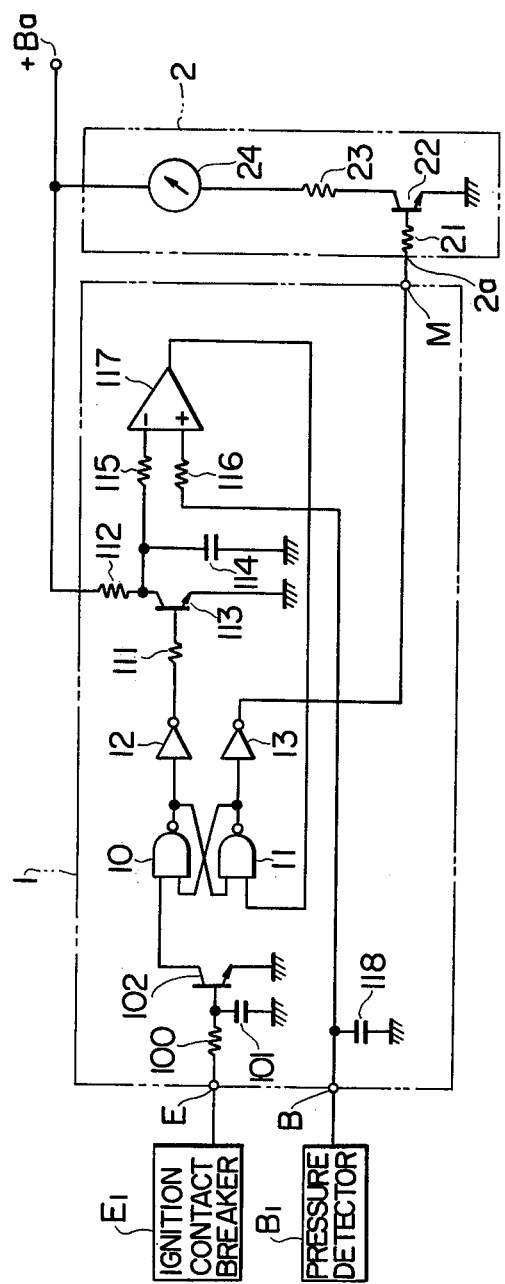
FIG. 1 is a wiring diagram showing an embodiment of a fuel consumption measuring device according to the present invention.

Referring first to the wiring diagram of FIG. 1 showing the general construction of a first embodiment of a fuel consumption measuring device according to the invention, numeral 1 designates a control circuit consisting of a multiplier circuit whereby a signal having a pulse width proportional to the amount of fuel consumed during each ½ of a revolution of an internal combustion engine is generated in accordance with a signal corresponding to the number of revolutions of the engine and another signal corresponding to the amount of vacuum in the air inlet path of the engine which is proportional to the amount of air drawn into the engine. Numeral 2 designates an indication circuit constituting indication means which receives the signal generated from the control circuit 1 and having a pulse width proportional to the amount of fuel consumed for indicating the instantaneous fuel consumption in units of liters/sec, for example.

Figure 2:
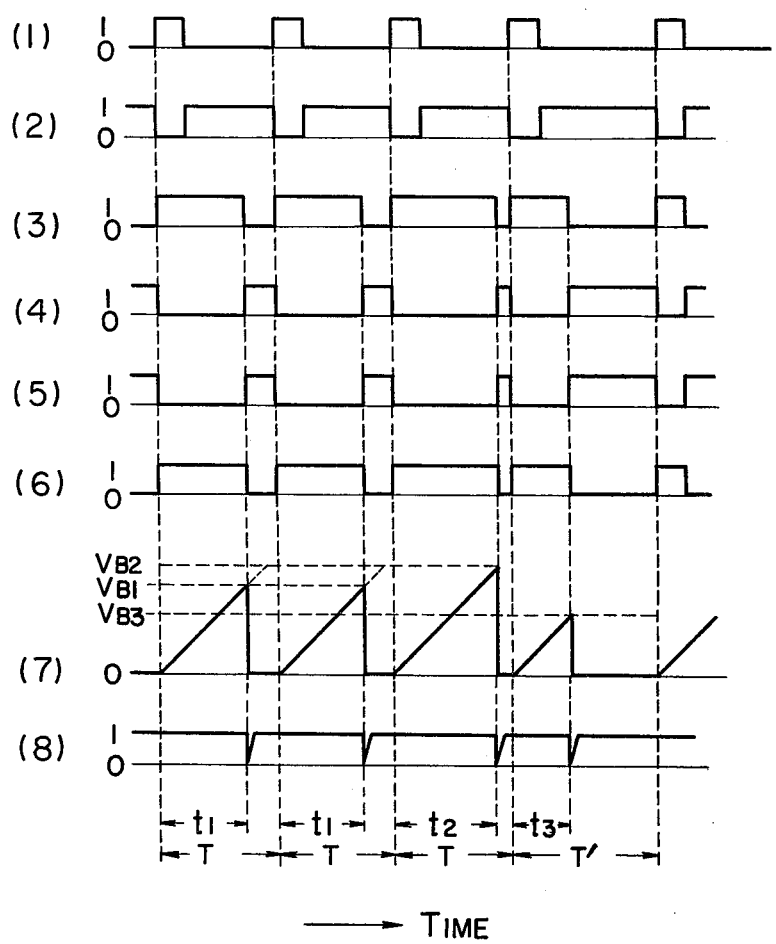
FIG. 2 is a voltage waveform diagram for explaining the operation of the device of this invention.

The operation of the first embodiment will now be described in connection with a more detailed description of the above-described construction. FIG. 2 is a waveform diagram showing the voltage waveforms generated at various points in the wiring diagram shown in FIG. 1. In FIG. 1, symbol +Ba designates a supply terminal connected to a power source (not shown) through an ignition key switch (not shown). Symbol E designates an input terminal to which are applied the engine revolution signals whose signal waveform is shown in FIG. 2(1), and since ignition signals generated in an ignition contact breaker $E_1$ of the engine are utilized as the revolution signals, if the engine is a two-cycle, four-cylinder engine whose revolution speed is N revolutions per minute, then the input terminal E receives the applied pulse signals at a period of $60 \times 2/N = T$ sec. On the other hand, if the revolution speed of the engine is N' revolutions per minute, then the input terminal E receives the applied pulse signals at a period of $60 \times 2/N' = T'$ sec. On the other hand, a voltage $V_B$ proportional to the amount of vacuum in the engine is applied to an input terminal B shown in FIG. 1 from a known pressure detector $B_1$ composed for example of a semiconductor pressure sensor connected in the form of a bridge, so that $V_B = V_{Bo}$ or the maximum when the vacuum is 0 mm Hg or the throttle valve is wide open, whereas when the throttle valve is closed thus increasing the vacuum to 100 mm Hg and the atmospheric pressure is 760 mm Hg, then the applied voltage $V_{B100}$ to the input terminal B becomes as low as $V_B = (760-100/760) \times V_{Bo}$.

Generally, when the vacuum is X mm Hg, the corresponding voltage $V_X$ applied to the input terminal B is given as $V_X = (760-X/760) \times V_{Bo}$. Now, as the signal of the waveform shown in FIG. 2(1) is applied to the input terminal E shown in FIG. 1, the signal is applied to the base of a transistor 102 through a resistor 100 and the inverted signal of the signal of FIG. 2(1) applied to the input terminal E is generated at the collector of the transistor 102 as shown in FIG. 2(2) since the emitter of the transistor 102 is grounded. A capacitor 101 connected between the base and emitter of the transistor 102 constitutes a noise filter. On the other hand, the collector of the transistor 102 is connected to one input of a NAND gate 10 constituting a flip-flop along with a NAND gate 11, so that at the instant that the signal at the collector of the transistor 102 goes from "1" to "0" the output of the NAND gate 10 goes from "0" to "1" as shown in FIG. 2(3) and, since the output of the NAND gate 10 is connected to the input of a NOT gate 12, the inverted signal of the output signal of the NAND gate 10 is generated at the output of the NOT gate 12 as shown in FIG. 2(4) thus going from 1 to 0. Since the output of the NOT gate 12 is connected through a resistor 111 to the base of a transistor 113 having its emitter grounded, its collector connected to the supply terminal +Ba through a resistor 112 and its collector also grounded through a capacitor 114, each time the output of the NOT gate 12 goes from 1 to 0, the voltage waveform signal at the collector of the transistor 113 gradually rises as shown in FIG. 2(7) with a time constant which is determined by the resistor 112 and the capacitor 114. On the other hand, a voltage $V_{B1}$ corresponding to the amount of vacuum in the engine is applied to the input terminal B shown in FIG. 1. The input terminal B is grounded through a capacitor 118 which serves as a noise filter. Since the input terminal B is connected to the non-inverting terminal of an analog comparator 117 through a resistor 116 and since the collector of the transistor 113 is connected to the inverting terminal of the analog comparator 117 through a resistor 115, at the instant that the collector voltage of the transistor 113 shown in FIG. 2(7) becomes $V_{B1}$, the output of the analog comparator 117 which has been at 1 now goes to 0 as shown in FIG. 2(8). When this occurs, the output of the flip-flop composed of the NAND gates 10 and 11 is inverted since the output of the analog comparator 117 is connected to the input of the NAND gate 11 in the flip-flop. Consequently, the outputs of the NAND gates 10 and 11 respectively become as shown in FIGS. 2(3) and 2(5) and thus the output of the NOT gate 12 becomes as shown in FIG. 2(4). Since the input of a NOT gate 13 is connected to the output of the NAND gate 11, the inverted signal of the output signal of the NAND gate 11 is generated at the output of the NOT gate 13 as shown in FIG. 2(6). When the output of the flip-flop changes as mentioned above, the output of the NAND gate 11 goes from 0 to 1, the output of the NAND gate 10 from 1 to 0, the output of the NOT gate 12 from 0 to 1 and the output of the NOT gate 13 from 1 to 0. When this occurs, the output of the NOT gate 12 goes from 0 to 1 so that the transistor 113 is turned on and its collector voltage goes from 1 to 0. Consequently, since the voltage at the inverting terminal of the analog comparator 117 is at 0 and the voltage at its non-inverting input is $V_{B1}$, the output of the analog comparator 117 goes from 0 to 1 as shown in FIG. 2(8). In the flip-flop including the NAND gates 10 and 11, however, the output of the NAND gate 10 remains at 0 and the output of the NAND gate 11 at 1 until a 0 signal is applied to the input terminal of the NAND gate 10. In this way, the above-described operation is repeated each time a 1 pulse is applied to the input terminal E and thus the pulses shown in FIG. 2(6) are generated at the output of the NOT gate 13. In other words, when the period of the pulses applied to the input terminal E of the control circuit 1 is T and the input voltage to the input terminal B of the control circuit 1 is $V_{B1}$, the 1 pulses having a time width $t_1$ are generated at the output of the NOT gate 13, whereas when the period of the pulses applied to the input terminal E of the control circuit 1 is T and the input voltage to the input terminal B of the control circuit 1 is $V_{B2}$ ($V_{B2} > V_{B1}$) the 1 pulses having a time width $t_2$ ($t_2 > t_1$) are generated at the output of the NOT gate 13, and when the period of the pulses applied to the input terminal E of the control circuit 1 is T' (T' > T) and the input voltage to the input terminal B of the control circuit 1 is $V_{B3}$ ($V_{B3} < V_{B1}$) the 1 pulses having a time width $t_3$ ($t_3 < t_1$) are generated at the output of the NOT gate 13. The output of the NOT gate 13 is connected to an output terminal M of the control circuit 1. The output terminal M is in turn connected to an input terminal 2a of the indication circuit 2 and the input terminal 2a is connected through a resistor 21 to the base of a transistor 22 having its emitter grounded and its collector connected through a current setting resistor 23 to a meter 24 consisting of an ammeter whose positive terminal is connected to the power source. Consequently, when for example the 1 pulses shown in FIG. 2(6) and having the period T and the time width $t_1$ are generated at the output terminal M of the control circuit 1, the transistor 22 in the indication circuit 2 is turned on at intervals of the period T for the duration of the time $t_1$ and current flows to the meter 24 for the duration of the time $t_1$, whereas the transistor 22 is turned off during each time period T minus $t_1$ and thus no current flows to the meter 24. Consequently, when the rotational speed of the engine is constant, if the negative pressure of its suction is close to the atmospheric pressure (760 mm Hg) and thus the voltage at the input terminal B of the control circuit 1 is high, the time width of the 1 pulses generated at the output terminal M of the control circuit 1 is increased thus causing the pointer of the meter 24 in the indication circuit 2 to deflect considerably, whereas when there is a big difference between the vacuum and the atmospheric pressure (760 mm Hg) the meter 24 deflects narrowly, though the period is the same in both cases. On the other hand, when the amount of vacuum in the engine is constant, if the rotational speed of the engine is high, the period of the 1 pulses generated at the output terminal M of the control circuit 1 decreases thus increasing the deflection of the pointer of the meter 24 in the indication circuit 2, whereas the deflection of the meter 24 is decreased when the rotational speed of the engine is low, although the pulse width is the same in both cases. In this way, an integration of a given time $T_O$ of the 1 pulse generated at the output terminal M of the control circuit 1 is proportional to the amount of fuel consumed by the engine during the time $T_O$. It has been proved by experiments that by adding the indication circuit 2 and causing the pointer of the meter 24 to deflect, the amount of deflection of the meter 24 is in proportion to the instantaneous fuel consumption of the engine.

Figure 3:
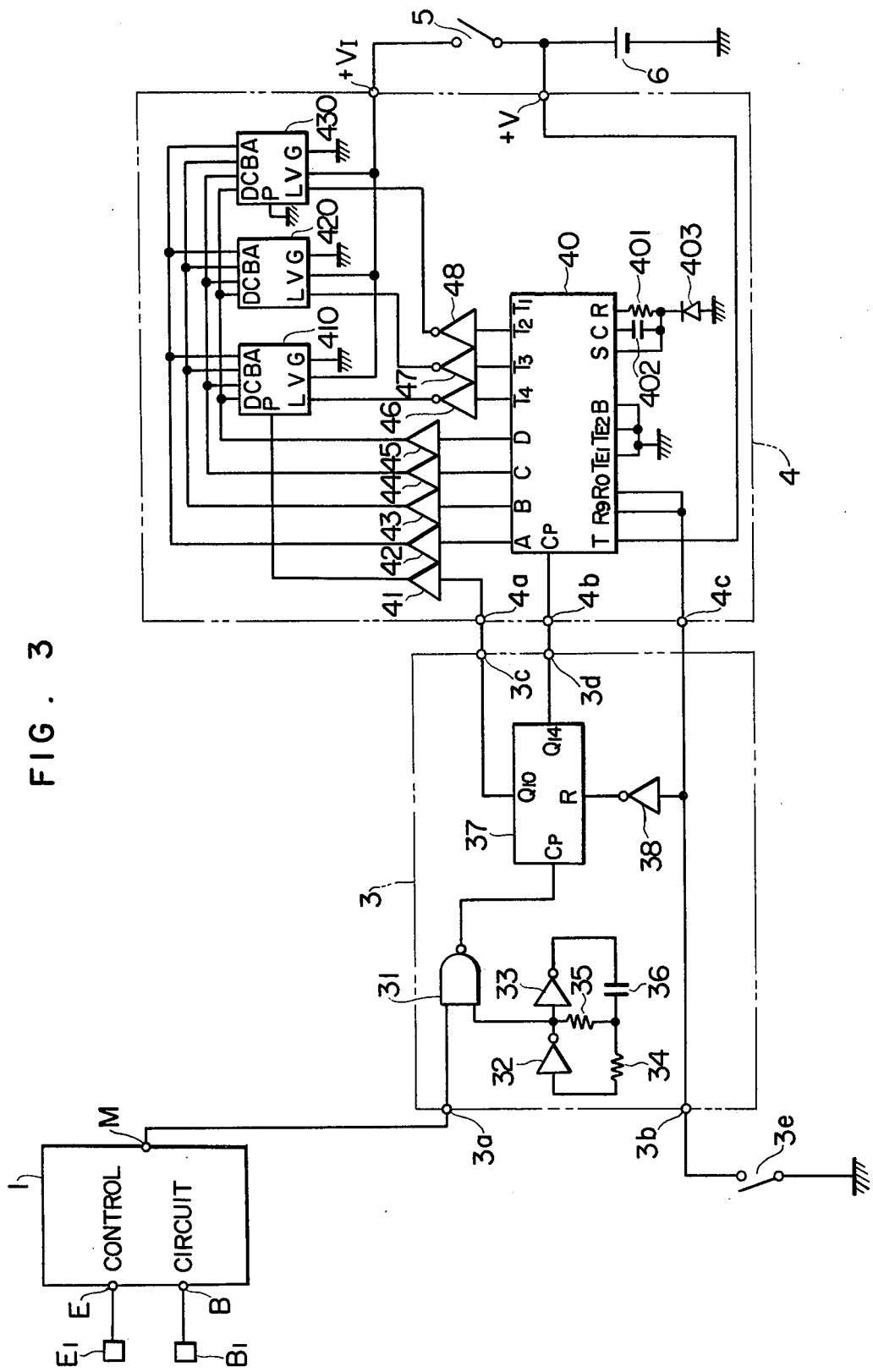
FIG. 3 is a wiring diagram showing another embodiment of the device of this invention.

The second embodiment shown in FIG. 3 and designed to indicate the integrated value of fuel consumption in addition to the indication of the instantaneous values of fuel consumption will now be described. A control circuit 1 which is identical in construction with the control circuit shown in FIG. 1 has its output terminal M connected to an input terminal 3a of a conversion frequency divider 3 which is a conversion signal generator, and an input terminal 4b of a counter type indication circuit 4 is connected to an output terminal 3d of the conversion frequency divider 3 to indicate the conversion signals, that is, the number of pulses (each pulse corresponding to the fuel consumption of 10 c.c.s. according to the experiments) applied to the input terminal 4b is counted by the counter type indication circuit 4 and indicated by light emitting diode (LED) digit display elements 410, 420 and 430 constituting a display unit of the counter type indication circuit 4.

The construction and operation of the second embodiment will now be described in greater detail with reference to FIG. 3. The 1 level width of each pulse signal supplied from the output terminal M of the control circuit 1 is directly proportional to the amount of fuel consumed per revolution of the engine. This pulse signal is applied to the input terminal 3a of the conversion frequency divider 3 which is connected to one input terminal of a NAND gate 31 and the other input terminal of the NAND gate 31 receives modulating signals from a known type of oscillation circuit comprising NOT gates 32 and 33, resistors 34 and 35 and a capacitor 36. Consequently, the modulated signals are generated at the output of the NAND gate 31 only when the pulse signal applied to the input terminal 3a is a 1 signal. The output of the NAND gate 31 is in turn connected to a clock terminal $C_P$ of a counter type frequency divider 37 consisting of the known RCA CD4020 so that NM pulses of the modulated signal is counted and subjected to $NM/2^{14}$ frequency division in the counter type frequency divider 37 and the resulting divided pulses are generated at its output terminal $Q_{14}$. In the experiments conducted, it was designed so that each of the divided pulses corresponded to the fuel consumption of 10 c.c.s. The output terminal 3d of the conversion frequency divider 3 is connected to the output terminal $Q_{14}$ of the counter type frequency divider 37 and the output terminal 3d is also connected to the input terminal 4b of the counter type indication circuit 4. An input terminal 3b of the conversion frequency divider 3 is a terminal to which a reset signal for the counter type frequency divider 37 is applied by a reset switch 3e and which is connected to a reset input terminal R of the counter type frequency divider 37 through a NOT gate 38, so that the counter type frequency divider 37 is reset when a 0 signal is applied to the input terminal 3b in response to the closing of the reset switch 3e, whereas the operation of counting and frequency division is accomplished when a 1 signal is applied to the input terminal 3b.

On the other hand, the input terminal 4b of the counter type indication circuit 4 is connected to a clock input terminal $C_P$ of a four-digit decade counter circuit 40 consisting of a counter type integration circuit. The four-digit decade counter circuit 40 is the known Tokyo Shibaura TC5001C. A storage signal terminal T of the counter circuit 40 is connected to a +V power supply to always receive a 1 signal and reset terminals $R_9$ and $R_0$ are connected to an input terminal 4c of the counter type indication circuit 4 which is in turn connected to the input terminal 3b of the conversion frequency divider 3. Consequently, similarly as the input terminal 3b, the four-digit decade counter circuit 40 of the counter type indication circuit 4 is reset when a 0 signal is applied to the input terminal 4c, whereas the counting is performed when a 1 signal is applied to the input terminal 4c. Test terminals $TE_1$ and $TE_2$ and an extinction terminal B are all grounded, and terminals S, C and R are terminals which are oscillated to produce scan clocks. A resistor 401 is connected between the terminals R and S, a capacitor 402 is connected between the terminals C and S the terminal S is connected to the cathode of a diode 403 whose anode is grounded. Indication signal output terminals A, B, C and D of the four-digit decade counter circuit 40 are respectively connected to the input terminals of non-inverting buffer gates 42, 43, 44 and 45, and scan signal output terminals $T_4$, $T_3$ and $T_2$ are respectively connected to the input terminals of inverting buffer gates 46, 47 and 48. The output terminals of the non-inverting buffer gates 42, 43, 44 and 45 are respectively connected to the respective input terminals A, B, C and D of LED digit display elements 410, 420 and 430, and the output terminals of the inverting buffer gates 46, 47 and 48 are respectively connected to the corresponding lutch terminals L of the LED digit display elements 410, 420 and 430. Each of the LED digit display elements 410, 420 and 430 is the known led display 5082-7302 manufactured by the Yokokawa Hewlett Packard. The respective supply terminals V of the LED digit display elements 410, 420 and 430 are connected to a $+V_1$ supply terminal which supplies the supply voltage only when an indication is required and the other supply terminals G are grounded. In other words, the $+V_1$ supply terminal is connected to a power source 6 through for example an ignition key switch constituting interrupting means which closes when an indication is required. On the other hand, the LED digit display elements 410, 420 and 430 respectively indicate a tens digit, units digit and first decimal place digit, and a signal terminal P for the decimal point preceding the digit indicated by the LED digit display element 430 is grounded so that it is normally lighted when the voltage is applied to the +V supply terminal. Consequently, when the digits respectively indicated by the LED digit display elements 410, 420 and 430 are 1, 3 and 5, they read 13.5 liters. In other words, when 1,234 pulses are applied to the input terminal 4b of the counter type indication circuit 4, these pulses are counted by the four-digit decade counter circuit 40 so that since the least important digit ($T_1$) was not indicated as shown in FIG. 3 in the case of the experiments, the LED digit display elements 410, 420 and 430 respectively display the corresponding digits of 1, 2 and 3 which read 12.3 liters. Further, since the power supply path of the four-digit decade counter circuit 40 is connected to the power source 6 through the +V supply terminal to which the voltage is always applied even when the indications are extinguished and the four-digit decade counter circuit 40 stores the integrated count value even when the indicated digits of the LED digit display elements 410, 420 and 430 are extinguished by opening an ignition key switch 5, the total amount of fuel consumed after the device has been reset is displayed on the LED digit display elements 410, 420 and 430 when their indications are lighted.

Thus, by determining the amount of fuel consumption in c.c.s. corresponding to the time width of 1 pulses generated at the output terminal M of the control circuit 1 and the corresponding oscillation frequency of the oscillation circuit in the conversion frequency divider 3 to thereby modulate the pulses generated from the output terminal M of the control circuit 1, each of the pulse signals generated at the output terminal 3d of the conversion frequency divider 3 corresponds to the fuel consumption of 10 c.c.s.

Since the above-mentioned oscillation frequency is determined by the NOT gates 32 and 33, the resistors 34 and 35 and the capacitor 36, it is possible to determine the oscillation frequency by only the resistor 35 and the capacitor 36. Further, if a new engine is used with a resulting change in the fuel consumption per revolution, the necessary adjustment can be effected by simply changing the oscillation frequency. On the other hand, since each of the pulse signals generated at an output terminal $Q_{10}$ of the counter type frequency divider 37 in the conversion frequency divider 3 represents the fuel consumption corresponding to 1/16 of 10 c.c.s. and these pulse signals are coupled through an output terminal 3c, an input terminal 4a of the counter type indication circuit 4 and the non-inverting gate 41 to a signal terminal P of the LED digit display element 410 which lights a dot-like light emitting display element preceding the digit displayed by the LED digit display element 410 or the leftmost digit of every three-digit number, it is possible to judge the amount of fuel consumed from moment to moment in accordance with the flashing rate of this light spot.

Experiments conducted with the fuel consumption measuring device of the type described above showed the errors of less than 10%. These errors were caused under the worst working conditions and thus the actual error in measuring the fuel consumption of automotive vehicles while running will not be so great.

Further, the present invention is equally applicable to any fuel consumption measurements irrespective of the number of cylinders and capacities of internal combustion engines as well as the unit quantities of fuel consumption to be indicated. Still further, the present invention is not limited to internal combustion engines for automotive vehicles and it is equally applicable to any device used with an internal combustion engine of the type in which fuel is drawn simultaneously with a gas such as air or oxygen by virtue of a vacuum on the suction.

Furthermore, while in the two embodiments of the invention described above, a voltage proportional to the number of revolutions of an internal combustion engine and another voltage proportional to the degree of vacuum in the engine are utilized as inputs to the device and the product of the engine revolutions and the intake gas amount is analogically obtained, even a digital quantity proportional to the vacuum may be subjected to digital multiplication so that the resulting product is measured in terms of the fuel consumption.

Still further, while in the above-described embodiments, ignition signals are detected to provide signals per every revolution of the engine, it is possible to utilize an analog signal or the like provided that the engine revolutions are distinguishable.

Still further, while in the above-mentioned embodiments, the amount of fuel consumed is indicated on the display, it is possible to arrange so that an indication is given from an indication means such as a buzzer or chime when the amount of fuel consumed exceeds a predetermined value.

Still further, while in the above-described embodiments, the pressure detector $B_1$ is used as intake gas amount signal generating means so that the vacuum in a gas induction passage is detected to generate a signal corresponding to the amount of gas taken in, it is possible to heat the gas taken in so that a rise in the temperature of the gas in relation to the heating capacity is detected to generate a signal corresponding to the intake gas amount or alternately a windmill may be provided in the gas induction passage so that the revolution speed of the windmill is detected to generate a signal corresponding to the intake gas amount.

Still further, while, in the above-described embodiments, the control circuit 1 is composed of a multiplier circuit, in view of the fact that the value obtained by multiplying the engine revolutions and the intake gas amount together merely represents an approximation of the amount of fuel consumed, the control circuit 1 may be comprised for example of a read-only memory storing a fuel consumption characteristic obtained from the results of experiments or the like so that the addresses of the read-only memory is selectively read out in accordance with the intake gas amount and the engine revolutions to measure the amount of fuel consumed.

Still further, while, in the second embodiment, power is supplied from the same power source 6 to both of the LED digit display elements 410, 420 and 430 and the four-digit decade counter circuit 40, it is of course possible to supply power to the LED digit display elements 410, 420 and 430 and the four-digit decade counter circuit 40 from two separate power sources.

What is claimed is:

1. A fuel consumption measuring device for measuring the amount of fuel consumed in an internal combustion engine of a type in which fuel and another gas are burned together at a certain ratio therebetween, comprising:
   a battery;
   revolutions signal generating means for generating a revolutions signal in synchronism with the revolutions of said engine;
   intake gas amount signal generating means for generating an intake gas amount signal corresponding to the amount of said gas drawn into said engine;
   a control circuit connected to said intake gas amount signal generating means and said revolutions signal generating means for generating a pulse signal in synchronism with said revolutions signal, said pulse signal having a pulse width proportional to said intake gas amount signal; and
   indication means, connected to said battery to be intermittently supplied with a constant voltage therefrom in response to and only during said pulse signal, for indicating the average rate of fuel consumption.

2. A device according to claim 1, wherein said intake gas amount signal generating means comprises pressure sensing means for detecting the pressure in a gas induction passage of said engine, and said control circuit comprises a multiplier circuit for multiplying an output signal of said pressure sensing means and said revolution signal together and generating an output signal corresponding to the instantaneous consumption of fuel.

3. A device according to claim 1, wherein said indication means comprises display means for indicating the instantaneous consumption of fuel.

4. A device according to claim 1, wherein said intake gas amount signal generating means comprises pressure sensing means for detecting the pressure in a gas induction passage of said engine.

5. A device according to claim 1, wherein said indication means comprises an ammeter and a transistor connected in series therewith for intermittently supplying said ammeter with the electric power in response to said pulse signal.

6. A fuel consumption measuring device comprising:
   a battery;
   revolutions signal detecting means for generating a signal in synchronism with the revolutions of an internal combustion engine;
   intake air amount detecting means for generating a signal corresponding to the flow of air to said engine varying in accordance with the operating conditions of said engine;
   a control circuit connected to both of said detecting means for measuring the amount of fuel consumed by said engine in accordance with the output signals of said detecting means;
   conversion signal generating means connected to said control circuit for integrating output signals of said control circuit whereby each time a resulting integrated value reaches a predetermined unit quantity of the consumption of fuel an integration operation is repeated to generate a conversion signal in synchronism with said integration operation;
   counting means connected to said conversion signal generating means for counting said conversion signal and memorizing the count value thereof with the constantly supplied electric power from said battery; and
   display means connected to said counting means and said battery through a key switch for displaying the fuel consumption amount in response to said memorized count value during the closure of said key switch.

* * * * *